United States Patent
Saks

(10) Patent No.: US 9,780,824 B2
(45) Date of Patent: Oct. 3, 2017

(54) CASE FOR MOBILE ELECTRONIC DEVICE WITH FRICTION CONTAINMENT

(71) Applicant: Benjamin Saks, Pittsburgh, PA (US)

(72) Inventor: Benjamin Saks, Pittsburgh, PA (US)

(73) Assignee: Benjamin Saks, Pittsburgh, PA (US)

( * ) Notice: Subject to any disclaimer, the term of this patent is extended or adjusted under 35 U.S.C. 154(b) by 0 days.

(21) Appl. No.: 14/461,498

(22) Filed: Aug. 18, 2014

(65) Prior Publication Data

US 2015/0053730 A1    Feb. 26, 2015

Related U.S. Application Data

(60) Provisional application No. 61/867,665, filed on Aug. 20, 2013.

(51) Int. Cl.
  *A45F 3/00*    (2006.01)
  *H04B 1/3888*    (2015.01)
  *A45C 11/00*    (2006.01)
  *H04M 1/18*    (2006.01)

(52) U.S. Cl.
  CPC ............ *H04B 1/3888* (2013.01); *A45C 11/00* (2013.01); *H04M 1/185* (2013.01); *A45C 2011/002* (2013.01)

(58) Field of Classification Search
  CPC .............. A45C 11/00; A45C 2011/001; A45C 2011/002; H04B 1/3888; H04M 1/185
  USPC ...... 206/320, 305, 523, 591, 5.1; 455/575.1, 455/575.8, 575.9; 361/679.02; 379/454, 379/455
  See application file for complete search history.

(56) References Cited

U.S. PATENT DOCUMENTS

| | | | | |
|---|---|---|---|---|
| 2,359,480 A | * | 10/1944 | Jackson | D06F 13/02 248/678 |
| 3,939,978 A | * | 2/1976 | Thomaswick | B65D 5/5033 206/453 |
| 5,903,645 A | * | 5/1999 | Tsay | B60R 11/0241 248/316.4 |
| 6,073,901 A | * | 6/2000 | Richter | B60R 11/0241 224/558 |
| 7,104,398 B1 | * | 9/2006 | Wisecarver | G02B 23/12 206/316.3 |
| D603,389 S | | 11/2009 | Khan et al. | |
| 8,256,612 B1 | * | 9/2012 | Wang | A45C 11/00 206/320 |
| 8,457,701 B2 | * | 6/2013 | Diebel | H04B 1/3888 206/701 |
| 8,695,798 B2 | * | 4/2014 | Simmer | G06F 1/1626 206/320 |
| 2008/0302456 A1 | | 12/2008 | Cook | |
| 2010/0240427 A1 | | 9/2010 | Lee | |
| 2013/0292281 A1 | * | 11/2013 | Chung | H04B 1/3888 206/320 |

\* cited by examiner

*Primary Examiner* — Chun Cheung
(74) *Attorney, Agent, or Firm* — Leydig, Voit & Mayer, Ltd.

(57) ABSTRACT

A case for a portable electronic device includes a back wall with front face, a rear face and an outer edge. A containment wall extends forward from the front face around at least a portion of the outer edge of the back wall and is configured to hold the portable electronic device within the case by friction. The containment wall includes an unobscuring free end such that an entire front surface of the portable electronic device is unobscured from view when held within the case.

23 Claims, 5 Drawing Sheets

CASE FOR MOBILE ELECTRONIC DEVICE WITH FRICTION CONTAINMENT

CROSS-REFERENCE TO RELATED APPLICATIONS

This patent application claims the benefit of priority to U.S. patent application Ser. No. 61/867,665, filed Aug. 20, 2013, and entitled "Case for Mobile Electronic Device with Friction Containment," which application is incorporated in its entirety herein by this reference.

BACKGROUND

There are presently a wide variety of portable electronic devices. Mobile cellular telephones, with estimated billions of active units, are available in a range of different shapes and sizes, as either smart phones or feature phones, with a variety of different functions. Other portable electronic devices exist, as well, such as portable music players and digital video players. Moreover portable notebook computers have long been popular and tablet computers are likewise growing in popularity.

Many portable electronic devices can store and play music, or at least transmit digital music signals to earphones, headphones or loudspeakers. Some of these devices have built in speakers and/or microphones, whereas others do not. Some portable electronic devices also have front and/or back facing combined still-video cameras, or may only have a rear facing camera, for example, on the opposite side from the touch screen or keys.

Some portable electronic devices have the capability to download programs or Apps (short for software "Applications") from a virtual marketplace or directly from the internet, whereas others cannot. Further, some portable electronic devices have the capability to join a wireless network using Wi-Fi whereas others do not have that capability.

Some portable electronic devices have the ability, using an App, to become "virtual" or "soft" telephones using VoIP (otherwise known as Voice Over Internet Protocol) utilizing, for example, a Wi-Fi network connection to connect to the internet, whereas others do not have that capability.

Cameras can and have been placed on various parts of these kinds of mobile devices. Most cell phones have their camera on the opposite side of the device from their keyboard, number pad or touch screen. Many newer devices also have front facing cameras (on the same side of the device as the touch screen) in order to facilitate video conference calls. The older versions of those devices either did not have cameras at all or only had rear facing cameras (on the side of the device opposite the touch screen) and did not have front facing cameras.

Since most portable electronic devices are relatively fragile and include glass as a major component, owners are often interested in protecting them by putting the mobile device in a case which would help prevent damage if, for example, they are accidentally dropped by the user. Other cases are used as an accessory to the device to provide a visual identity or fashion element. Such cases are described and/or shown in US2010/0240427; US2008/0302456 and U.S. Pat. No. D603,389. Some of the major case producers are Belkin, Griffin Technologies, Speck Products, iFrogz, iSkin, Incase, OtterBox, and Case-Mate. The vast majority of these cases simply contain the device within a hard or soft shell designed essentially to snuggly fit around the device. Many of these cases are made of hard plastic such as a polycarbonate or soft polymers such as silicone. Other cases are crafted from leather. Many of the cases also incorporate screen protectors or clips to facilitate attachment to a belt or clothing. Most cases include openings at various points to allow the user to have access to the device controls, switches and connector ports.

None of the cases for these mobile electronic devices attach to the device without the need for the case to physically capture the device. Some cases have two pieces and necessitate the need for separation in order to remove the case from the device. Some of the cases that are made of a soft material slip easily on and off the device but they still need to cover a portion of the front of the device in order to say attached. None of these provide a means of attaching to the device without covering a portion of the front edge of the device.

Known cases have a number of shortcomings. The two piece hard shell cases require difficulty in attaching and removing them from the device. The action of attaching and removing weakens the connecting parts and limits the usefulness of the case and its lifespan. The cases that wrap fully around the device provide increased difficulty in using accessories for the device such as charging cables, headphones, and docks. Soft shell cases allow for the ease of attachment and removal from the device however they do not protect the device from falls as well as a hard case. In addition, the material used for these cases is sticky and has a high friction coefficient which makes the case/device difficult to place into and take out of pants pockets and other personal storage areas.

SUMMARY

In an embodiment, the present invention provides a case for a portable electronic device including a back wall with front face, a rear face and an outer edge. A containment wall extends forward from the front face around at least a portion of the outer edge of the back wall and is configured to hold the portable electronic device within the case by friction. The containment wall includes an unobscuring free end such that an entire front surface of the portable electronic device is unobscured from view when held within the case.

BRIEF DESCRIPTION OF THE DRAWINGS

The present invention will be described in greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
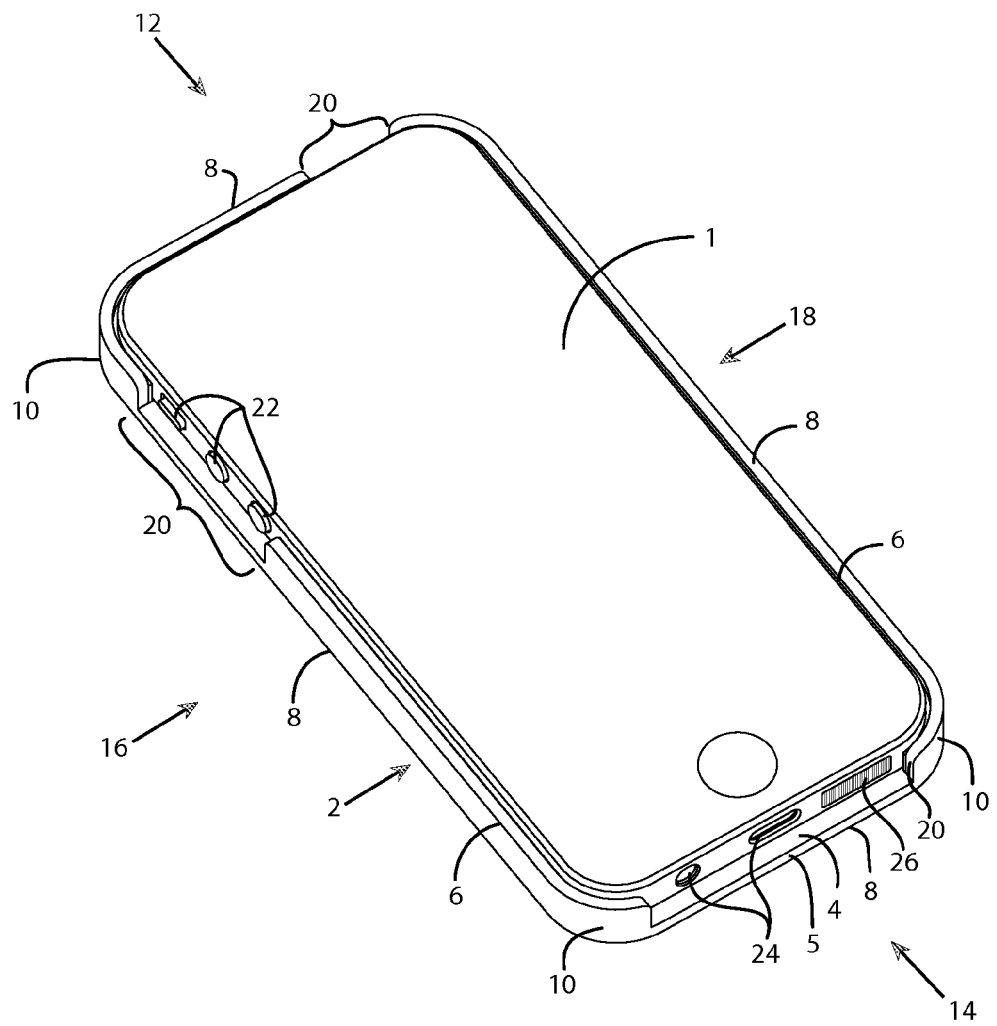
FIG. 1 shows a perspective view of a portable electronic device held in a case in accordance with an embodiment of the invention.

FIG. 1 shows a portable electronic device 1 disposed within a case 2 that is both aesthetically pleasing and provides a degree of impact security for the electronic device 1 if the device strikes an object or is dropped. The case 2 is formed by a back wall 4, which is substantially concealed by the electronic device 1 in FIG. 1, and a containment wall 6 extending around at least a portion of an outer edge 5 of the back wall. The containment wall 6 includes an inner surface that retains the device 1 inside the case 2 by a frictional engagement between the containment wall 6 and the sides of the portable electronic device 1, as described in greater detail below. As a result of the frictional engagement of the electronic device 1 within the case 2, the front of the containment wall 6 is able to have an unobscuring free end that leaves the entire front surface of the electronic device unobscured from view. In other words, in contrast to most electronic device cases, the containment wall 6 does not extend inward over the front surface of the electronic device. Furthermore, the forward end of the containment wall 6 is a free end and does not have anything attached thereto, such as a holding device that extends over the front surface of the electronic device 1. Thus, the friction provided between the containment wall 6 and the sides of the device 1 retain the device securely within the case without the need to hold the front surface of the device 1 at all.

In accordance with most portable electronic devices, the back wall 4 of the case 2 is substantially planar and may be entirely flat, as shown, or may include a slight curvature on the inside to accommodate a corresponding curvature of the rear surface of the device or a slight curvature on the outside to provide a more ergonomic fit in the user's hand. Further, with respect to a front view, the case is substantially rectangular such that the back wall has a substantially rectangular configuration. In this illustrated configuration, the outer edge 5 of the back wall has four linear sections 8 arranged in two parallel pairs disposed at right angles to one another forming a rectangular shape. Between adjacent linear sections 8, the outer edge 5 includes rounded corners 10. In an alternative configuration, the substantially rectangular configuration of the back wall 4 could include four sharp corners connected by slightly curved edges. Of course, the configuration of the back wall could also be a precise rectangle with linear edges and sharp corners. The rectangular configuration provides the case 2 with an elongate dimension defining the height of the case and extending from the top 12 to the bottom 14 of the case. The shorter dimension defines the width of the case extending from a left side 16 to a right side 18. Moreover, the dimension extending from the rear surface of the back wall 4 to the forward free end of the containment wall defines the thickness of the case the depth of the containment wall 6.

In the illustrated embodiment the containment wall 6 does not extend around the entire outer perimeter of the case. Instead, gaps are formed by one or more reveal cuts 20 disposed in the path of the containment wall 6 around the perimeter. In the illustrated embodiment, the reveal cuts 20 are positioned to provide access to the outer edge of the phone, where desired. For example, many electronic devices include switches 22 disposed on the outer edge of the device that need to be accessed by a user. The reveal cuts 20 provide this access by forming a corresponding gap in the containment wall. These reveal cuts 20 can also be provided to allow access to electronic connection ports 24 or to keep a speaker 26 free from obstruction. In the illustrated embodiment, the reveal cut 20 at the bottom 14 of the device extends across the entire linear portion of the outer edge 5.

Figure 2:
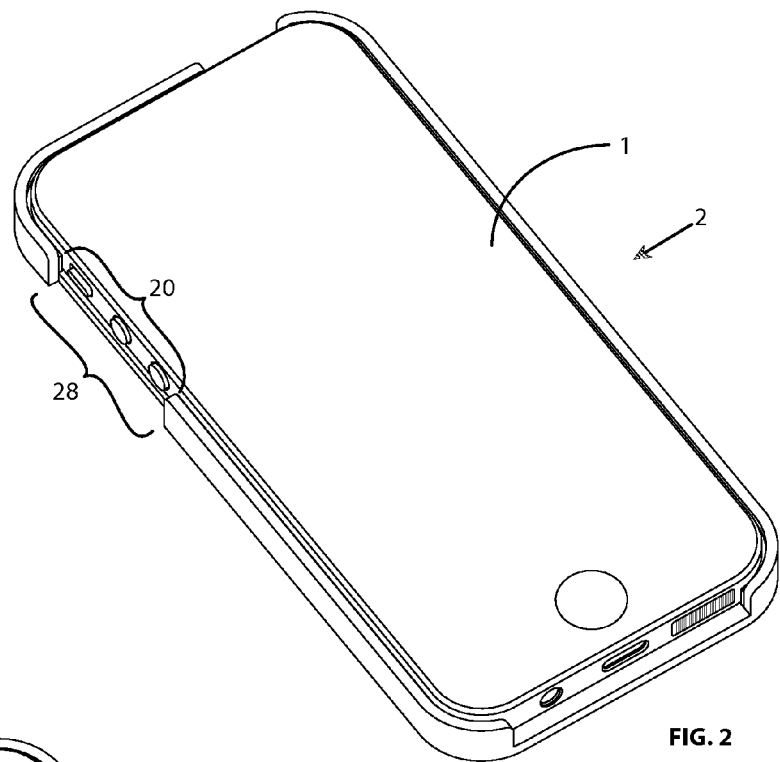
FIG. 2 shows a perspective view of a portable electronic device held in a case in accordance with another embodiment of the invention.
Figure 3:
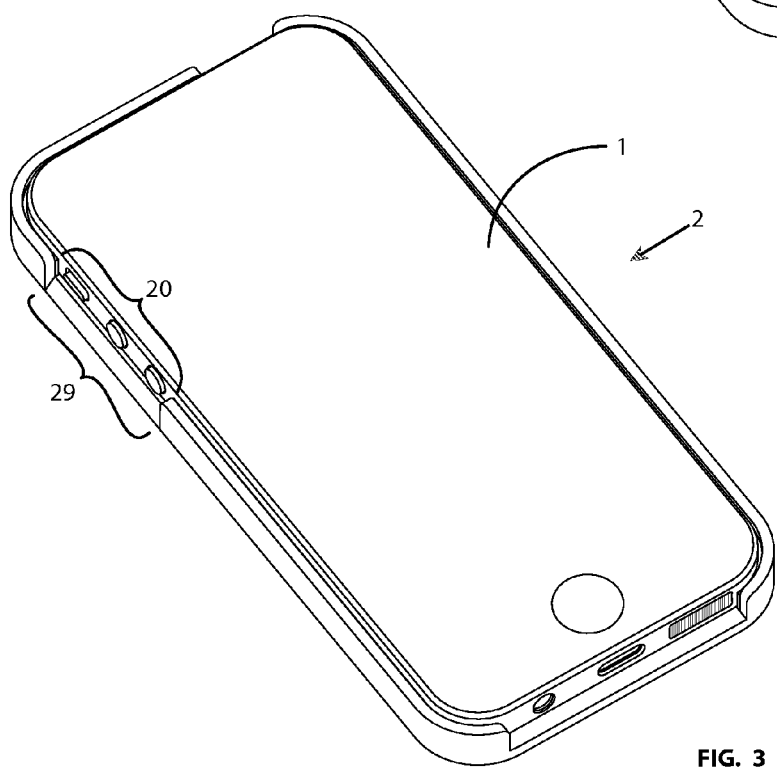
FIG. 3 shows a perspective view of a portable electronic device held in a case in accordance with yet another embodiment of the invention.

In the illustrated embodiment, the back wall 4 provides a smooth outer edge 5 extending around the electronic device and the reveal cuts 20 extend forward from the back wall 4. This configuration provides added stability to the adjacent sections of the of the containment wall 6, but the corresponding section of the back wall 4 adjacent to the reveal cut 20 may provide a hindrance to accessing the respective parts, particularly switches 22, of the portable electronic device. Accordingly, in an alternative embodiment, as shown in FIG. 2, the back wall 4 can include a slot 28 that is aligned with the corresponding reveal cut 20 so as to provide unhindered access to the respective parts of the device 1. In one embodiment, the reveal cuts 20 are disposed only within linear sections of the containment wall 6, such that containment wall 6 is secure and complete around each corner of the case 2. For aesthetic value and comfort, as shown in the drawings, the edges of the containment wall 6 that are adjacent to the reveal cut may be rounded. While the embodiment in FIG. 2 provides unhindered access to the switches 22, it also results in a visible break in the outline of the back wall 4 when the case is viewed from the rear. In order to maintain a uniform aesthetic around the outline of the case from the rear, the embodiment shown in FIG. 3 uses a chamfer 29 to provide improved access to switches 22 while avoiding the visible break resulting from the slot 28 included in FIG. 2. The chamfer 29 extends diagonally from the inside edge of the reveal cut 20 to the outside edge of the back wall 4 at the rear face 42.

Figure 4:
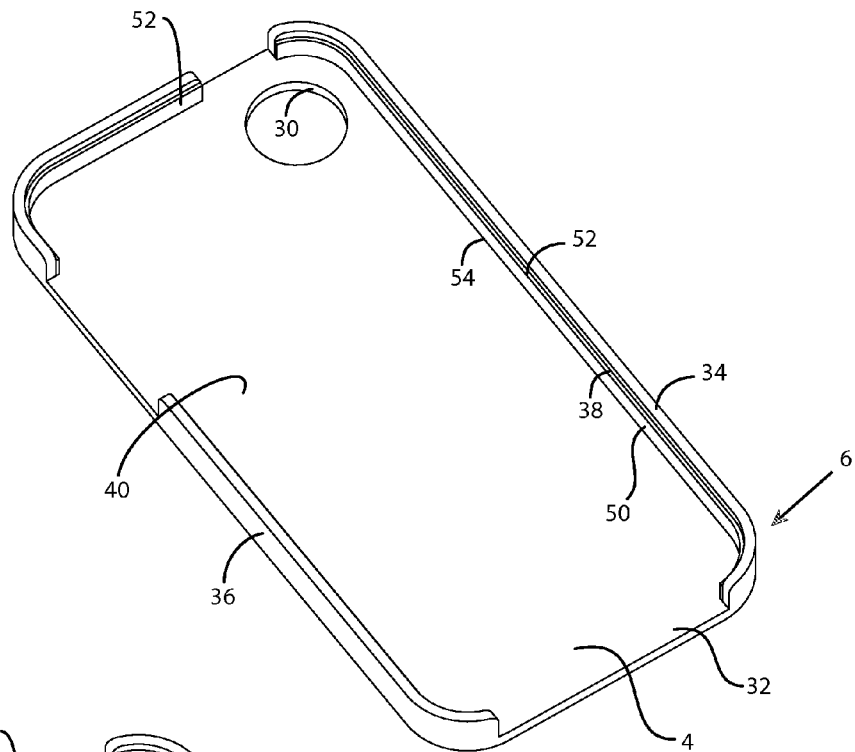
FIG. 4 shows a front perspective view of the portable electronic device case shown in FIG. 1.
Figure 5:
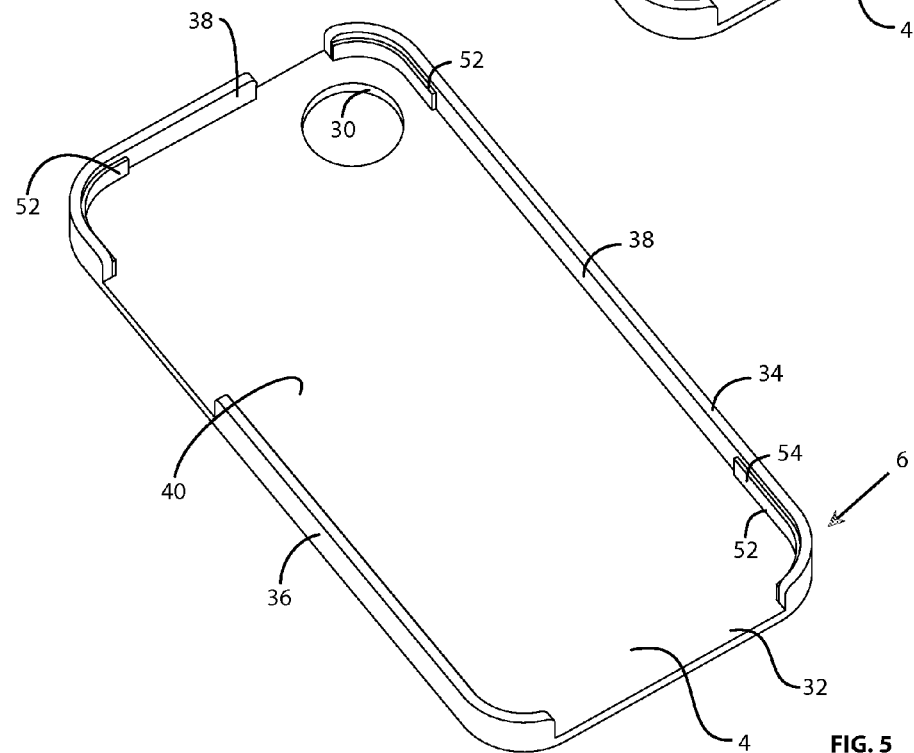
FIG. 5 shows a front perspective view of the portable electronic device case in accordance with another embodiment of the invention.
Figure 6:
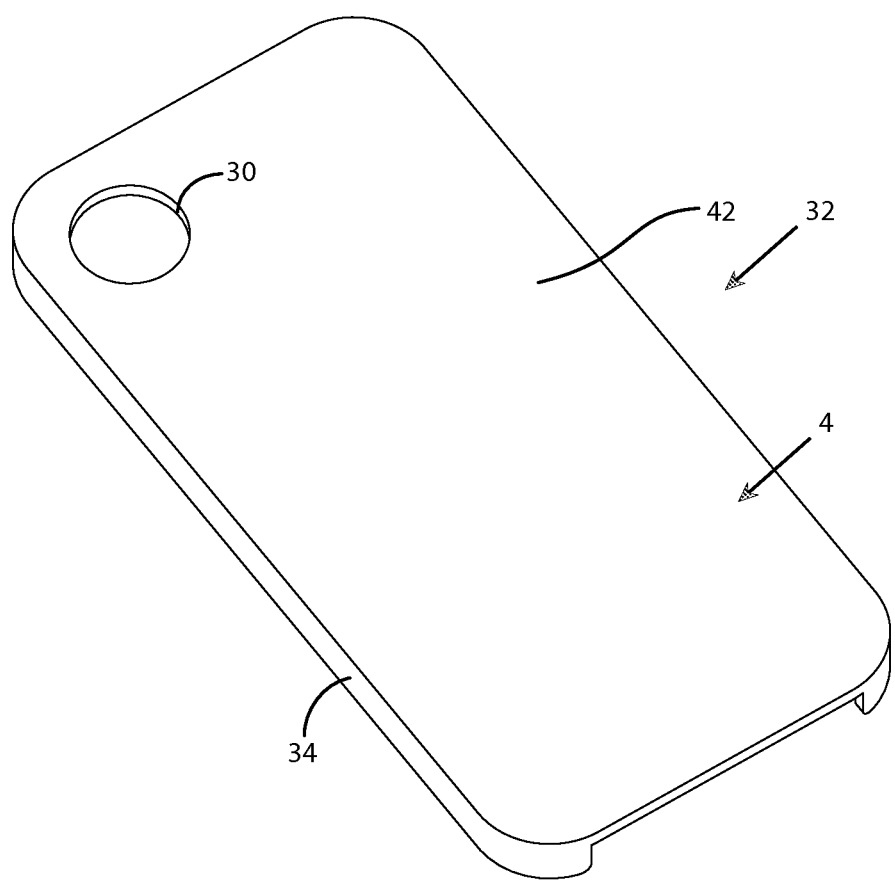
FIG. 6 shows a rear perspective view of the portable electronic device case shown in FIG. 1.

As shown in FIGS. 4 to 6, the back wall 4 of the case 2 includes an aperture 30 that provides multiple functions. First, the aperture 30 allows access to the rear of the portable electronic device 1 so that a user can press the device forward and out of the case. In connection with this function, the aperture is preferably large enough that most users can insert his or her thumb through the aperture 30 to a sufficient depth that the device 1 will be at least partially removed from the case 2. In this regard, the aperture may be circular and include a diameter of about 0.6 inches. Preferably, the aperture 30 is at least 0.5 inches in diameter. Another function of the aperture 30 is to provide an opening for a camera and/or camera flash. Therefore, consistent with the position of the camera on most mobile phones, the aperture 30 may be positioned toward the top 12 of the case 2. For example, the aperture 30 may be positioned within 25% of the overall height of the case 2 from the top end 12. Alternatively, the case could include more than one aperture, or the aperture 30 could be disposed in a different location of the back wall. For example, the aperture 30 could be disposed in a position that would reveal indicia on the device, such as a trademark.

As best seen in FIG. 4, the portable electronic device case 2 includes an outer container 32 and a compressible friction element 50. The outer container 32 forms the back wall 4 of the case and includes a perimeter wall 34 that provides the outer portion of the containment wall 6. The terms outer, outward, inner and inward, are used herein as descriptions in relation to the case as a whole when the device is inserted in the case. Accordingly, an inner surface is one that faces the device when the device is inserted in the case and an outer surfaces faces away from the device. Likewise, the inward direction is toward the device and the outward direction is away from the device. Thus, even though surfaces that are configured to face the device are exposed when the device is not inserted in the case, these surfaces should not be construed as "outer" surfaces. The perimeter wall 34 includes an outer surface 36 facing outward and an inner surface 38 that faces the device 2. The compressible friction element 50 is disposed on the inner surface 38 of the perimeter wall 34 and forms an inner portion of the containment wall 6, at least in sections.

The outer container 32 is preferably formed of a sufficiently hard material that the outer container 32 is rigid. The term rigid, as used herein, is an indication of the amount of shape retention maintained by the container 32 under load. As used herein, a rigid container is defined as a container that cannot be bent such that a portion of the back wall is at an angle of more than 90 degrees from another portion of the back wall without undergoing plastic deformation or breaking For example a rigid container cannot be bent such that a portion of a surface of the back wall at one end of the container is at an angle of 90 degrees or more from another portion of that same surface at an opposite end of the container. Further, the material of the container preferably has a Young's modulus of at least 5 GPa. For example, the container 32 can be made out of a soft or hard wood. Woods that have a Young's modulus, along the grain, of at least 9 GPa, such as oak, are particularly preferred. Engineered wood products, for example plywood, particle board or oriented strand board are also materials that are suitable for making the outer container 32. In addition, the container 32 could be made from hard plastics, such as polycarbonate, PVC, HDPE, nylon, epoxy or delrin, metals, such as aluminum or stainless steel, organic plastics, for example polyactic acid, hard rubber, a carbon fiber reinforced material, or glass fiber reinforced concrete.

In a preferred embodiment, the outer container 32 is formed as a single body, which is defined herein as a component that does not have any moving parts. In a particular embodiment, the outer container is a single integral piece, where the phrase "single integral piece" is defined herein as a one-piece construction without separate parts that are connected by either fasteners, adhesives or any manufacturing joining process, such as welding. The container 32 can, in certain embodiments be manufactured using a machining process, where a mass of the container material is provided and portions of the material are removed by cutting or milling until the desired shape is achieved. Alternatively, the container 32 can be manufactured by a shaping procedure, such as casting, molding or stamping, where the material is pressed or poured into a desired shape and then, if necessary, hardened.

Figure 7:
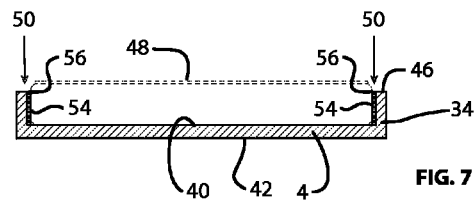
FIG. 7 shows a top cross-sectional view of the portable electronic device case shown in FIG. 1.
Figure 8:
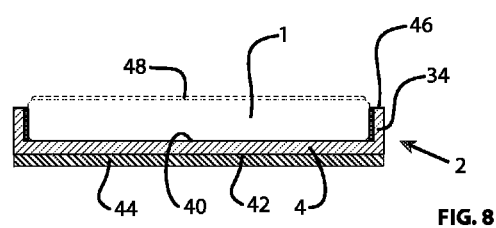
FIG. 8 shows a top cross-sectional view of another embodiment of a portable electronic device case in accordance with the present invention.

As stated above, the container 32 forms the back wall 4 of the case 2 and the perimeter wall 34, which provides at least the outer portion of the containment wall 6. Preferably, the entirety, or at least majority, of the front face 40 of the back wall 4 is exposed and directly contacts the rear of the device 1 when it is inserted in the case. Alternatively, portions of the front face 40 may be covered by a lining or cushioning element to provide impact resistance between the device and the hard material of the container 32. Likewise, the rear face 42 of the back wall 4 can be exposed and viewable at all times, as shown in FIG. 7. Alternatively, an outer layer 44 can be disposed on the container 32 covering the rear face 42 of the back wall 4, as shown in FIG. 8. A specific example of such a construction is described in more detail below.

The perimeter wall 34 extends forward from the back wall 4 at an outer edge 5 thereof. As shown in FIGS. 7 and 8, around the entire periphery of the case, the forward end 46 of the perimeter wall extends only forward and does not include any inward protrusion for assisting the compressible friction element in retaining the electronic device within the case. Thus, the perimeter wall does not obscure any portion of the front surface 48 of the electronic device 1, including a screen disposed thereon, from view. Likewise, the forward end 46 of the perimeter wall is a free end, and thus, no additional element is disposed on the forward end 46 of the perimeter wall that aids in containing the electronic device or that obscure the view of the front surface 48 of the device 1.

Figure 9:
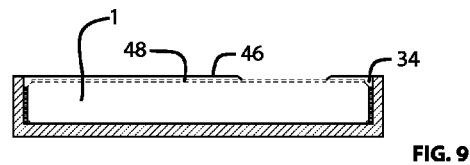
FIG. 9 shows a top cross-sectional view of yet another embodiment of a portable electronic device case in accordance with the present invention.

In view of the absence of an element or section of the case that wraps over the front surface 48 of the device 1 to hold the device in place, the depth of the perimeter wall 34 can be sized such that the forward end 46 of the perimeter wall 34 is shy of the front surface 48 of the device 1. In other words, the thickness of the device 1 may be greater than the depth of the perimeter wall 34. Alternatively, as shown in FIG. 9, the outer perimeter wall 34 can have a depth such that the forward end 46 is proud of the front surface 48 of the electronic device 1.

In the illustrated embodiment, the perimeter wall 34 extends around a majority of the outer edge 5 of the case. In particular, the outer edge is provided in the vicinity of each of the corners of the back wall 4. Alternatively, it is possible that the perimeter wall 34 could be provided around a smaller percentage of the outer edge 5. For example, the perimeter wall could be confined to the corners 10 of the back wall or to the linear sections 8 of the back wall 4. It is also conceivable that the perimeter wall 34 could be provided only on two opposing sides of the case, such as the left side 16 and right side 18, with the top 12 and bottom 14 of the case being provided without any perimeter wall.

To securely hold the portable electronic device 1 within the case 2, the compressible friction element 50 is disposed on the inside surface 38 of the perimeter wall 34. With the device 1 in place within the case 2, the compressible friction element 50 provides a degree of static friction on the outer surface of the device that prevents the device from falling out or being accidentally removed from the case 2.

As shown in FIG. 4, the compressible friction element 50 can be provided in sections 52. In this embodiment, the sections 52 entirely correspond to the extension of the perimeter wall 34, such that the inside surface 38 of the wall 34 is provided with the sections 52 of the compressible friction element 50 about the entirety of the perimeter wall. Alternatively, as shown in FIG. 5, the sections 52 could cover a smaller amount of the perimeter wall 34. For example, the sections 52 of the compressible friction element 50 could be provided only in the corners 10 of the perimeter wall or only along the linear sections 8. In fact, if the perimeter wall 34 itself provides sufficient friction with outer surface of the device, it is conceivable that the compressible friction element 50 could be provided along only one side of the case 2. Preferably, when the compressible friction element 50 is in a relaxed state, the distance between the inner surface 54 of the friction element 50 on one side of the case and the inner surface 54 on the other side of the case is smaller than the corresponding height or width of the electronic device 1. Thus, the gap between opposing inner surfaces of the containment wall 6 is smaller than the corresponding portion of the electronic device 1 that fits within this gap. Accordingly, as the device 1 is inserted into the case, the compressible friction element 50 is elastically compressed by the device. In an exemplary embodiment, the difference between the size of the gap and the corresponding width or length of the electronic device is in a range of 0.004 inches and 0.040 inches, such that if the friction element 50 is disposed on opposing sides of the device 1, each element 50 compresses an amount ranging from 0.002 to 0.020 inches. In a preferred embodiment the case is configured with respect to a particular device, such that each compression friction element compresses at least 0.003 inches. With the device 1 in place within the case 2, the compressed friction element 50 is compelled to expand and be restored to its original shape and thus, provides a force on the outer surface of the electronic device. Thus, because the perimeter wall 6 and friction element 50 is disposed at least on opposing sides or corners of the portable electronic device, the resulting opposing forces clamp the device 1 within the case 2. Moreover, as a result of this restoring force of the friction element 50, the friction between the friction element 50 and the outer surface of the device 1 is increased and the friction element 50 is able to retain the electronic device 1 within the case 2.

Preferably, the material of the compressible friction element 50 differs from the material of the container 32. Exemplary materials of the compressible friction element 50 includes cork materials such as natural cork, engineered cork, or a cork rubber blend, organic rubber, non-organic polymers such as silicone rubber, or leather. The static friction provided between the compressible friction element 50 and the outer surface of the device 1 is dependent upon the coefficient of friction between the materials of the friction element 50 and the surface of the device 1 as well as the restoring force provided by the compressible friction element 50. In a preferred embodiment, the coefficient of friction between the friction element 50 and the corresponding surface of the device is at least 0.3. In a preferred embodiment, the total friction provided between the compressible friction element 50 and the corresponding surface of the device provides a holding force on the device in a range of 0.4 to 1.1 pounds, such that a force of 0.4 to 1.1 pounds is required to remove the device 1 from the case 2. In one embodiment, the amount of force required to remove the electronic device 1 from the case 2 is adapted to the weight of the device 1, such that the amount force needed to remove the device from the case is in a range of 2 to 5 times the weight of the device.

In the illustrated embodiment, the sections 52 of the compressible friction element 50 are fixed on the inner surface 38 of the perimeter wall 34 using an adhesive. However, it is also conceivable that the friction element 50 could be secured by a mechanical connection. For example, a portion of each section 52 could be compressed and inserted into a corresponding indentation in the inner surface 38 of the perimeter wall 34 or front face 40 of the back wall 4.

In the areas where the compressible friction element sections 52 are applied to the inner surface 38 of the perimeter wall 34, these sections 52 form the inner portion of the containment wall 6. Similar to the perimeter wall 34, each friction element section 52 also has a forward end 56 that extends straight forward and does not include any protrusion extending inwardly over a front surface 48 of the device 1. Further, the forward end 56 of each friction element section is a free end and is not attached to any element that extends over a front surface of the portable electronic device. Accordingly, the containment wall 6 as a whole includes a free end and does not extend over any portion of the front surface of the device 1 or obscure the user's view of the front surface of the device.

A specific and preferred embodiment of the present invention is formed from treated naturally occurring materials, where a naturally occurring material is defined as a plant or animal product. In this embodiment, the container 34 is made of wood that is machined and treated in the following method to form an appropriate foundation for the case 2. The wood is first kiln dried to a moisture content of less than 10%. The wood is then joined and planed to an appropriately sized billet and subsequently cut to length, forming a wood block. Alternatively, the wood block can be formed from laminations of multiple pieces of wood, which may be of differing species. The wood block is then machined to an untreated container element in the shape of the container 34 followed by a two-step stabilizing process. The first step in the stabilizing process includes submersion of the untreated element into a bath of resin, which allows the resin to impregnate the wood of the container element. For example, the resin may a heat cure low viscosity liquid epoxy resin or liquid acrylic. Optionally, the bath may be provided within a vacuum chamber, which promotes the impregnation of the resin into the wood. The container element is then removed from the bath and excess resin is removed. After the bath, the container element can be heat cured in an oven at an elevated temperature for a set period of time, for example a temperature of 200° F. for at least ten minutes.

After curing, the container element is sanded smooth and treated with a surface coating. The surface coating may include, for example, a low viscosity liquid cyanoacrylate or low viscosity epoxy resin. Application of the surface coating can be carried out, for example, using a smooth plastic applicator and any excess of the coating is removed. The coated element is then allowed to dry until it is ready for final sanding and finishing in order form the completed container 32 used in the case 2.

Sections 52 of a compressible friction element 50 are then applied to an inner surface 38 of the perimeter wall 34 of container 32. Similar to the container 32, the compressible friction element 50 is also formed from naturally occurring product, such as cork or leather.

The rear face 42 of the container 32 can be left exposed providing the visual of a one-piece wooden portable device case 2. Alternatively, an outer layer 44 of another product, for example another naturally occurring product, can be disposed over the rear face 42 of the container 32. In an exemplary embodiment, this outer layer 44 may be formed of tree bark that is laminated over the rear face 42 of the container 32. The outer layer 44 may be applied to the material of the container 32 prior to machining and stabilizing steps, or it may be applied to the finished container. Alternatively, the outer layer 44 could be a naturally occurring layer on the material of the container. For example, the container 32 could be made of the outer surface of a tree, where an outer layer 44 of bark already exists.

In many of the embodiments described and shown the portable electronic device is portrayed as a cellular telephone. However, the case described herein is not limited to use with phones and could also be used to cover other types of electronic devices, such as tablet computers, portable video or music players, gaming devices or one side of a notebook computer, such as the base or the screen.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

What is claimed is:

1. A case for a portable, rectangular electronic device having a front surface, the case comprising:
    a back wall including a front face, a rear face, and an outer edge; and
    a containment wall extending forward from the front face around at least a portion of the outer edge of the back wall, the containment wall being configured to hold the device within the case by friction,
    wherein the containment wall includes (i) an unobscuring free end that does not extend beyond the front surface of the device, such that the entire front surface is unobscured from view when held within the case, (ii) an outer perimeter wall, and (iii) a compressible friction element disposed on at least a portion of an inside corner of the containment wall,
    wherein an entire height of the containment wall is covered by the compressible friction element along at least a portion of an inside of the container wall, and
    wherein the outer perimeter wall and the back wall form a container that is integrally constructed in a rigid single body of wood.

2. The case recited in claim 1, wherein the container includes a first material and the compressible friction element includes a second material that is different from the first material.

3. The case recited in claim 2, wherein each of the first and second materials is a treated naturally occurring material.

4. The case recited in claim 2, further comprising an outer layer disposed on a rear face of the container.

5. The case recited in claim 1, wherein the wood is impregnated with a resin.

6. The case recited in claim 5, wherein a surface coating is disposed on the wood.

7. The case recited in claim 6, wherein the compressible friction element includes at least one of cork or leather.

8. The case recited in claim 1, wherein the compressible friction element includes at least one of cork or leather.

9. The case recited in claim 8, wherein the compressible friction element includes cork.

10. The case recited in claim 1, wherein the back wall is substantially planar.

11. The case recited in claim 1, having no element or section that wraps over the front surface.

12. The case recited in claim 1, which, aside from the compressible friction element, is configured as a rigid single body container.

13. The case recited in claim 1, wherein the compressible friction element includes cork.

14. A system, comprising:
    a case including:
    a back wall having a front face, a rear face, and an outer edge, and
    a containment wall extending from the front face about at least a portion of the outer edge of the back wall, the containment wall including a forward free end; and
    a portable, rectangular electronic device, including a front surface, the device being held within the case adjacent to the front face of the back wall by a frictional engagement of inner portions of the containment wall with an outer surface of the device such that the entire front surface of the device is unobscured from view by the case,
    wherein the containment wall includes (i) an unobscuring free end that does not extend beyond the front surface of the device such that the front surface is entirely unobscured from view, (ii) an outer perimeter wall, and (iii) a compressible friction element disposed on at least a portion of an inside corner of the containment wall,
    wherein an entire height of the containment wall is covered by the compressible friction element along at least a portion of an inside of the container wall, and
    wherein the outer perimeter wall and the back wall form a container that is integrally constructed in a rigid single body of wood.

15. The system recited in claim 11, wherein the compressible friction element includes at least one of cork or leather.

16. The system recited in claim 14, wherein the compressible friction element includes at least one of cork or leather.

17. The case recited in claim 16, wherein the compressible friction element includes cork.

18. The system recited in claim 14, wherein the wood is impregnated with a resin.

19. The case recited in claim 14, wherein the compressible friction element includes cork.

20. A method of making a portable electronic device case for holding a portable, rectangular electronic device having a front surface, the method comprising:
    shaping a single body of wood into a container element including:
    a back wall having a front face, a rear face, and an outer edge, and
    a perimeter wall extending from the front face about at least a portion of the outer edge of the back wall;
    subjecting the container element to a two-step stabilizing procedure; and
    disposing a compressible friction element to an inside corner of the perimeter wall, and on an entire height of the perimeter wall is covered by the compressible friction element along at least a portion of an inside of the perimeter wall, so as to form a containment wall with an unobscuring free end that does not extend beyond the front surface of the device such that the front surface of the device held in the case by friction is entirely unobscured from view by a user, wherein the outer perimeter wall and the back wall form a container that is constructed in a rigid single body of wood.

21. The method recited in claim 20, wherein the compressible friction element includes at least one of cork or leather.

22. The method recited in claim 20, wherein the two-step stabilizing procedure includes impregnating the wood with resin.

23. The method recited in claim 22, wherein the two-step stabilizing procedure includes providing a surface coating on the container.

* * * * *